US007430949B2

(12) United States Patent
Chiu

(10) Patent No.: US 7,430,949 B2
(45) Date of Patent: Oct. 7, 2008

(54) ANGLE ADJUSTMENT DEVICE FOR A PIVOT ARM OF A CIRCULAR SAW

(75) Inventor: Cheng Hung Chiu, Taichung County (TW)

(73) Assignee: Rexon Co., Ltd., Dali (TW)

(*) Notice: Subject to any disclaimer, the term of this patent is extended or adjusted under 35 U.S.C. 154(b) by 522 days.

(21) Appl. No.: 11/177,157

(22) Filed: Jul. 7, 2005

(65) Prior Publication Data

US 2007/0006704 A1 Jan. 11, 2007

(51) Int. Cl.
*B23D 45/04* (2006.01)

(52) U.S. Cl. .......................................... 83/473; 83/490

(58) Field of Classification Search ................ 83/471.3, 83/477.2, 490, 473, 581
See application file for complete search history.

(56) References Cited

U.S. PATENT DOCUMENTS 2,844,173 A * 7/1958 Gaskell ..................... 83/477.1
5,040,444 A * 8/1991 Shiotani et al. ............... 83/473
6,662,697 B1 12/2003 Chen
6,779,428 B2 * 8/2004 Kao ............................ 83/469
6,860,183 B1 3/2005 Chen
2003/0024365 A1 * 2/2003 Chang ....................... 83/471.3

* cited by examiner

*Primary Examiner*—Kenneth E. Peterson
(74) *Attorney, Agent, or Firm*—Bacon & Thomas, PLLC

(57) ABSTRACT

A circular saw includes a work table, and an angle adjustment device mounted on the work table. The angle adjustment device includes an outer tube, a drive block, an inner rod, a drive gear, a fixed rod, a push barrel, and a driving unit. Thus, the user can rotate the handgrip of the outer tube at the front side of the work table to change and adjust the tilt or bevel angle of the pivot arm directly, thereby facilitating the user adjusting the tilt angle of the pivot arm. In addition, the user can rotate the handgrip of the outer tube easily and conveniently, so that the tilt angle of the pivot arm is adjusted exactly.

17 Claims, 5 Drawing Sheets

ANGLE ADJUSTMENT DEVICE FOR A PIVOT ARM OF A CIRCULAR SAW

BACKGROUND OF THE INVENTION

1. Field of the Invention

The present invention relates to a circular saw, and more particularly to an angle adjustment device for a pivot arm of a circular saw.

2. Description of the Related Art

A conventional circular saw comprises a work table, a rotation shaft rotatably mounted on the work table and having an end provided with an actuated rack, a pivot arm pivotally mounted on the rotation shaft, a circular blade rotatably mounted on the pivot arm, a handle mounted on the pivot arm to move the pivot arm upward and downward, and an angle adjustment device mounted on the work table to change and adjust the tilt or bevel angle of the pivot arm by rotating the actuated rack of the rotation shaft.

SUMMARY OF THE INVENTION

The primary objective of the present invention is to provide an angle adjustment device for adjusting the tilt or bevel angle of a pivot arm of a circular saw.

Another objective of the present invention is to provide a circular saw, wherein the user can rotate the handgrip of the outer tube at the front side of the work table to change and adjust the tilt or bevel angle of the pivot arm directly, thereby facilitating the user adjusting the tilt angle of the pivot arm.

A further objective of the present invention is to provide a circular saw, wherein the user can rotate the handgrip of the outer tube easily and conveniently, so that the tilt angle of the pivot arm is adjusted exactly.

A further objective of the present invention is to provide a circular saw, wherein the disk spring is biased between the fixed rack and the push barrel to counteract a gap between the threaded guide portion of the fixed rod and the threaded guide hole of the push barrel, so that the tilt angle of the pivot arm is adjusted exactly.

Further benefits and advantages of the present invention will become apparent after a careful reading of the detailed description with appropriate reference to the accompanying drawings.

DETAILED DESCRIPTION OF THE INVENTION

Figure 1:
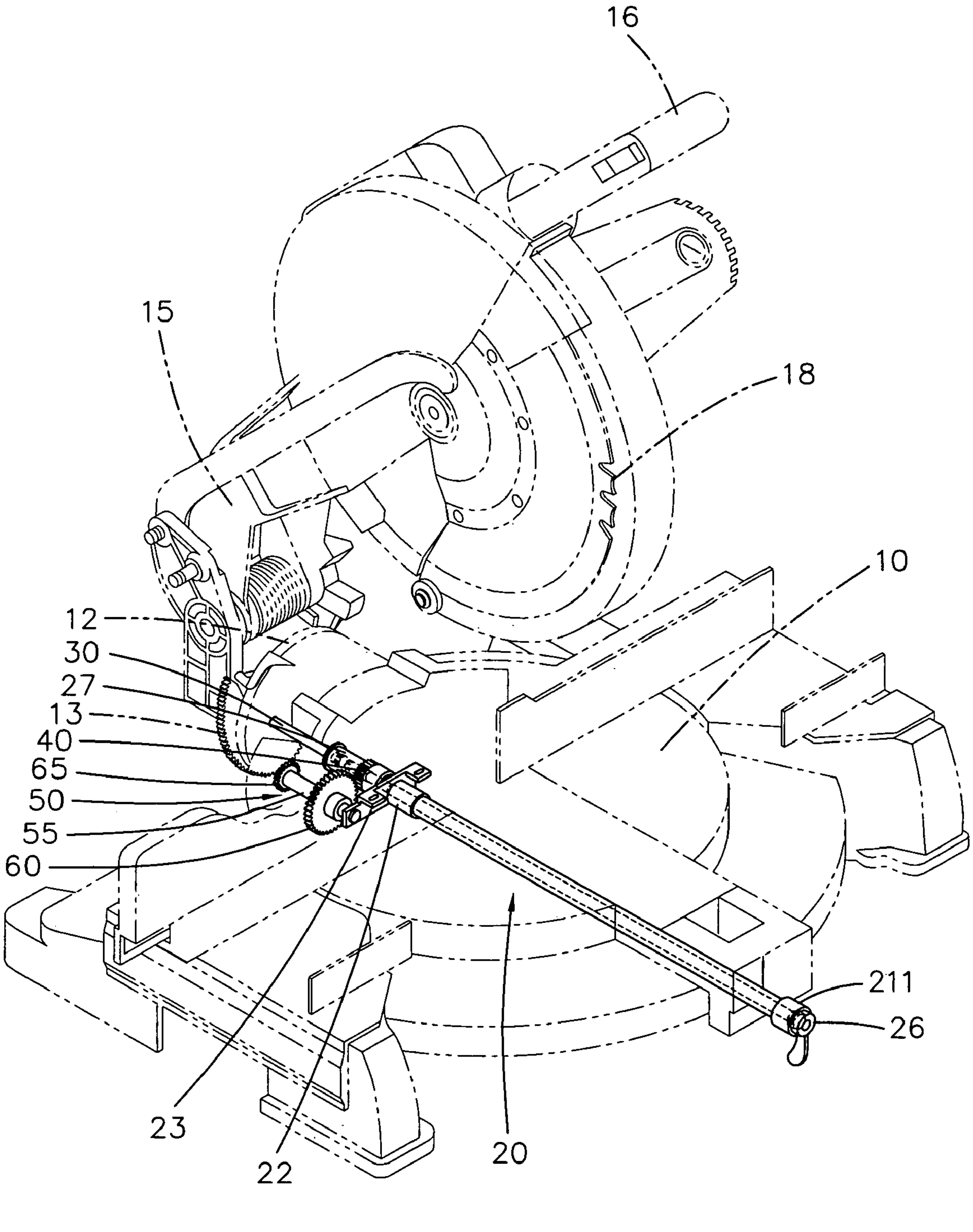
FIG. 1 is a perspective view of a circular saw in accordance with the preferred embodiment of the present invention.
Figure 2:
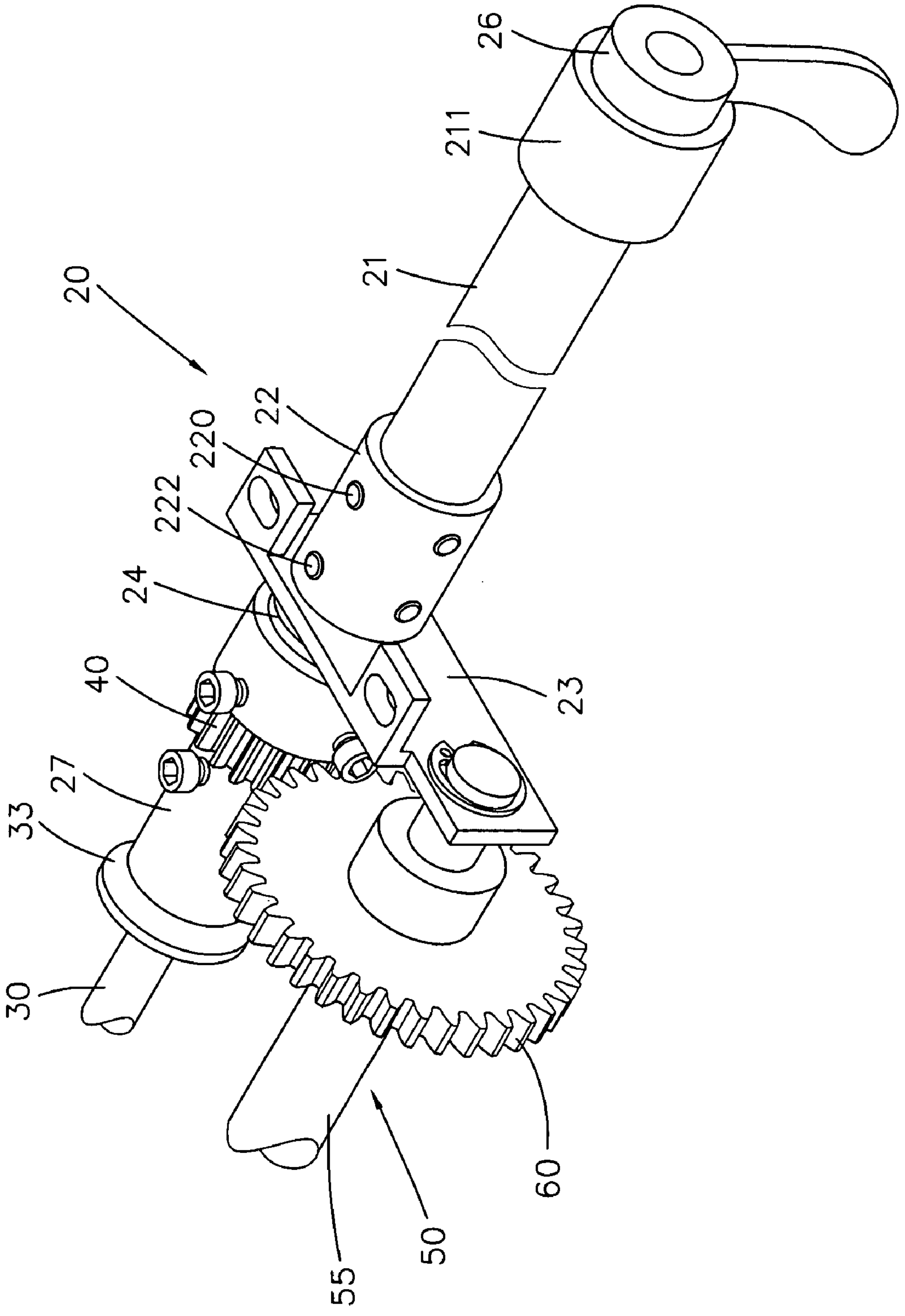
FIG. 2 is a partially cut-away perspective view of an angle adjustment device of the circular saw as shown in FIG. 1.
Figure 3:
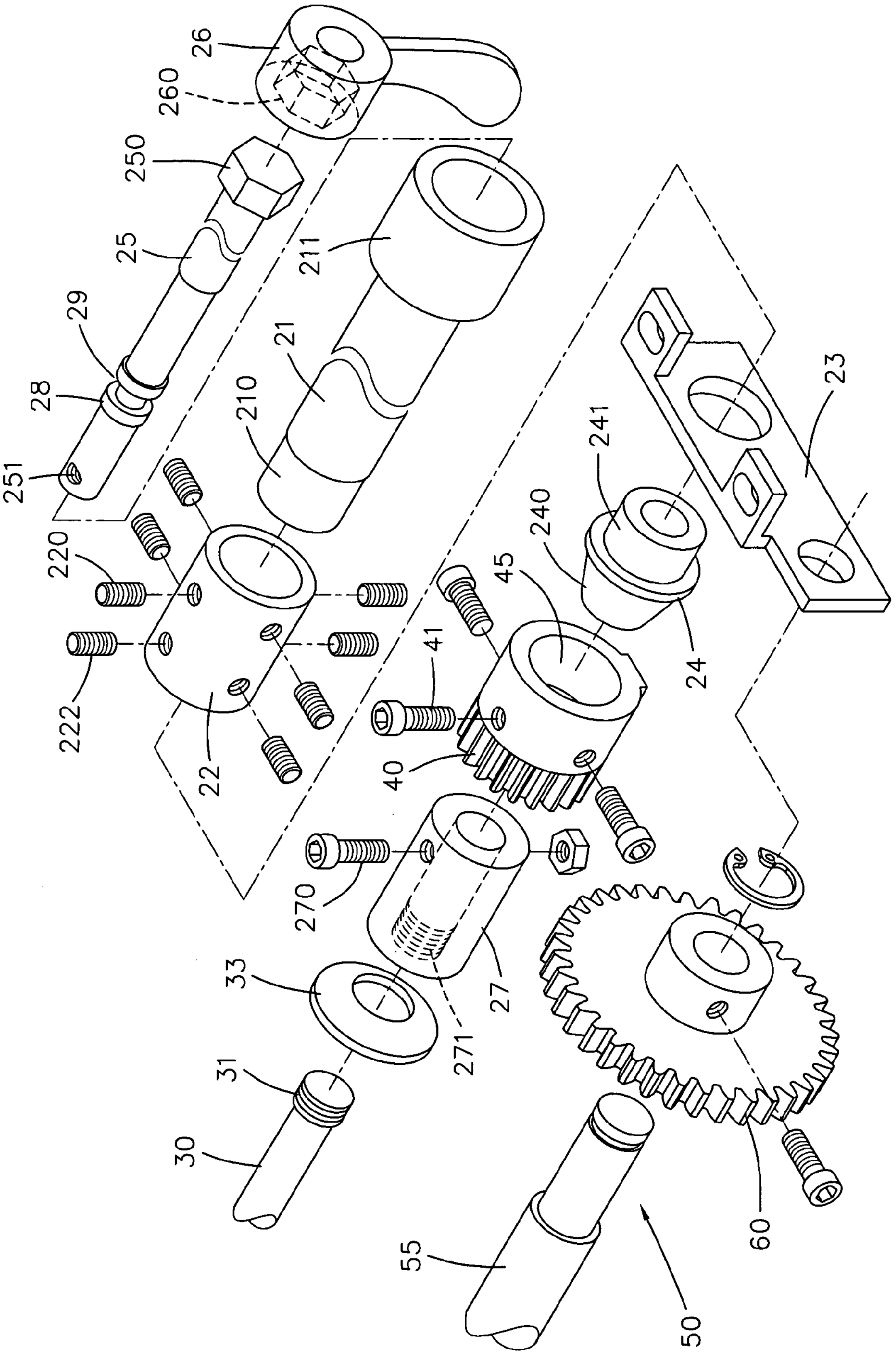
FIG. 3 is an exploded perspective view of the angle adjustment device of the circular saw as shown in FIG. 2.

Referring to the drawings and initially to FIGS. 1-3, a circular saw in accordance with the preferred embodiment of the present invention comprises a work table 10, and an angle adjustment device 20 mounted on the work table 10.

The circular saw further comprises a rotation shaft 12 rotatably mounted on the work table 10 and having an end provided with an actuated rack 13, a pivot arm 15 pivotally mounted on the rotation shaft 12, a circular blade 18 rotatably mounted on the pivot arm 15, and a handle 16 mounted on the pivot arm 15 to move the pivot arm 15 upward and downward.

The angle adjustment device 20 is used to change and adjust the tilt or bevel angle of the pivot arm 15 and includes an outer tube 21 rotatably mounted on a bottom of the work table 10, a drive block 24 having a first end secured to a first end of the outer tube 21 to rotate with the outer tube 21 synchronously, an inner rod 25 rotatably and movably mounted in the outer tube 21 and the drive block 24 and having a first end protruding outward from the drive block 24, a drive gear 40 movably mounted on the inner rod 25 and having a first end detachably urged on a second end of the drive block 24 to rotate with the drive block 24 by rotation of the outer tube 21, a fixed rod 30 located under the work table 10 and having a distal end formed with a threaded guide portion 31, and a push barrel 27 secured on the first end of the inner rod 25 to rotate and move with the inner rod 25 and having an inner wall formed with a threaded guide hole 271 screwed onto the threaded guide portion 31 of the fixed rod 30, wherein the threaded guide hole 271 of the push barrel 27 is movable relative to the threaded guide portion 31 of the fixed rod 30 by rotation of the push barrel 27 to move the push barrel 27 to push a second end of the drive gear 40 so as to push the drive gear 40 to move toward the drive block 24.

The angle adjustment device 20 further includes a fixing seat 23 secured on the bottom of the work table 10 for supporting the drive block 24, and a connecting tube 22 mounted between the first end of the outer tube 21 and the first end of the drive block 24 to connect the outer tube 21 with the drive block 24. Preferably, the first end of the outer tube 21 is formed with a reduced locking portion 210 inserted into the connecting tube 22 and locked by a plurality of setscrews 220, and the first end of the drive block 24 is formed with a reduced locking portion 241 extended through the fixing seat 23 and inserted into the connecting tube 22 and locked by a plurality of setscrews 222.

In addition, the second end of the drive block 24 has an end face formed with a tapered urging face 240, and the first end of the drive gear 40 has an end face formed with a tapered urging hole 45 detachably urged on the tapered urging face 240 of the drive block 24.

The outer tube 21 has a second end protruding outward from the work table 10 and formed with an enlarged cylindrical handgrip 211. The angle adjustment device 20 further includes a drive lever 26 rotatably and movably mounted on the handgrip 211 of the outer tube 21 and secured on a second end of the inner rod 25 to rotate the inner rod 25. Preferably, the second end of the inner rod 25 is formed with a hexagonal head 250, and the drive lever 26 has an inside formed with a hexagonal fixing recess 260 mounted on the hexagonal head 250 of the inner rod 25, so that the drive lever 26 is secured on the second end of the inner rod 25.

The drive gear 40 is movable on the inner rod 25 between the drive block 24 of the outer tube 21 and the push barrel 27 of the inner rod 25. The angle adjustment device 20 further includes a plurality of limit members 41 each extended through a peripheral wall of the drive gear 40 and each movably mounted on the inner rod 25. Preferably, the inner rod 25 has a mediate portion formed with two annular retaining flanges 28 and an annular retaining groove 29 located between the two retaining flanges 28, and each of the limit members 41 of the drive gear 40 is movable in the retaining groove 29 and stopped by the two retaining flanges 28 of the inner rod 25. Preferably, each of the limit members 41 of the drive gear 40 has a diameter smaller than a width of the retaining groove 29 of the inner rod 25, so that the drive gear 40 can idle relative to the inner rod 25 and can locally translate relative to the inner rod 25.

In addition, the first end of the inner rod 25 is formed with a threaded positioning bore 251, and the angle adjustment device 20 further includes a threaded positioning member 270 extended through a peripheral wall of the push barrel 27 and screwed into the positioning bore 251 of the inner rod 25, so that the push barrel 27 is secured on the first end of the inner rod 25.

The fixed rod 30 is rotatably mounted on a fixed rack 34 (see FIG. 4) on the work table 10. The angle adjustment device 20 further includes a disk spring 33 mounted on the fixed rod 30 and biased between the fixed rack 34 and the push barrel 27 to counteract a gap between the threaded guide portion 31 of the fixed rod 30 and the threaded guide hole 271 of the push barrel 27.

The circular saw further comprises a driving unit 50 for changing the tilt angle of the pivot arm 15 and including a shaft 55 rotatably mounted on the work table 10, a driven gear 60 secured on a first end of the shaft 55 to rotate the shaft 55 and meshing with and rotated by the drive gear 40, and a transmitting gear 65 (see FIG. 1) secured on a second end of the shaft 55 to rotate with the shaft 55 and meshing with the actuated rack 13 of the rotation shaft 12 to rotate the rotation shaft 12.

Thus, when the outer tube 21 is rotated by a user, the drive block 24 is rotated to rotate the drive gear 40 which rotates the driven gear 60 which rotates the shaft 55 which rotates the transmitting gear 65 which rotates the actuated rack 13 of the rotation shaft 12 to rotate the rotation shaft 12 so as to change and adjust the tilt or bevel angle of the pivot arm 15.

Figures 6, 7:
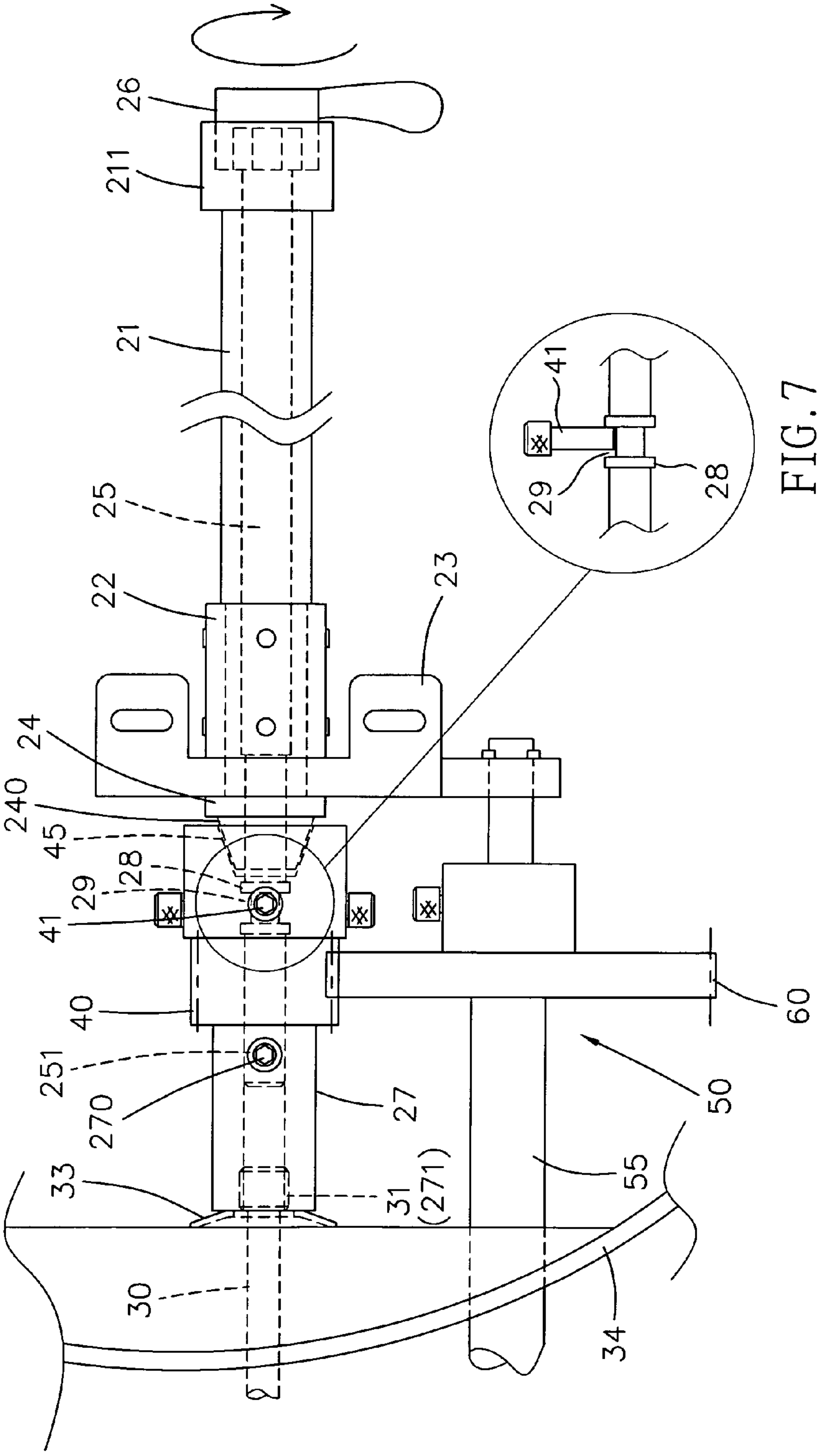
FIG. 6 is a schematic operational view of the angle adjustment device of the circular saw as shown in FIG. 2, showing the drive block and the drive gear in an detached position.
FIG. 7 is a locally enlarged view of the angle adjustment device of the circular saw as shown in FIG. 6.

In operation, referring to FIGS. 1-7, the tapered urging hole 45 of the drive gear 40 is initially detached from the tapered urging face 240 of the drive block 24 as shown in FIG. 6, so that the drive gear 40 is separated from the drive block 24. Thus, the drive gear 40 will not be rotated by the drive block 24.

Figures 4, 5:
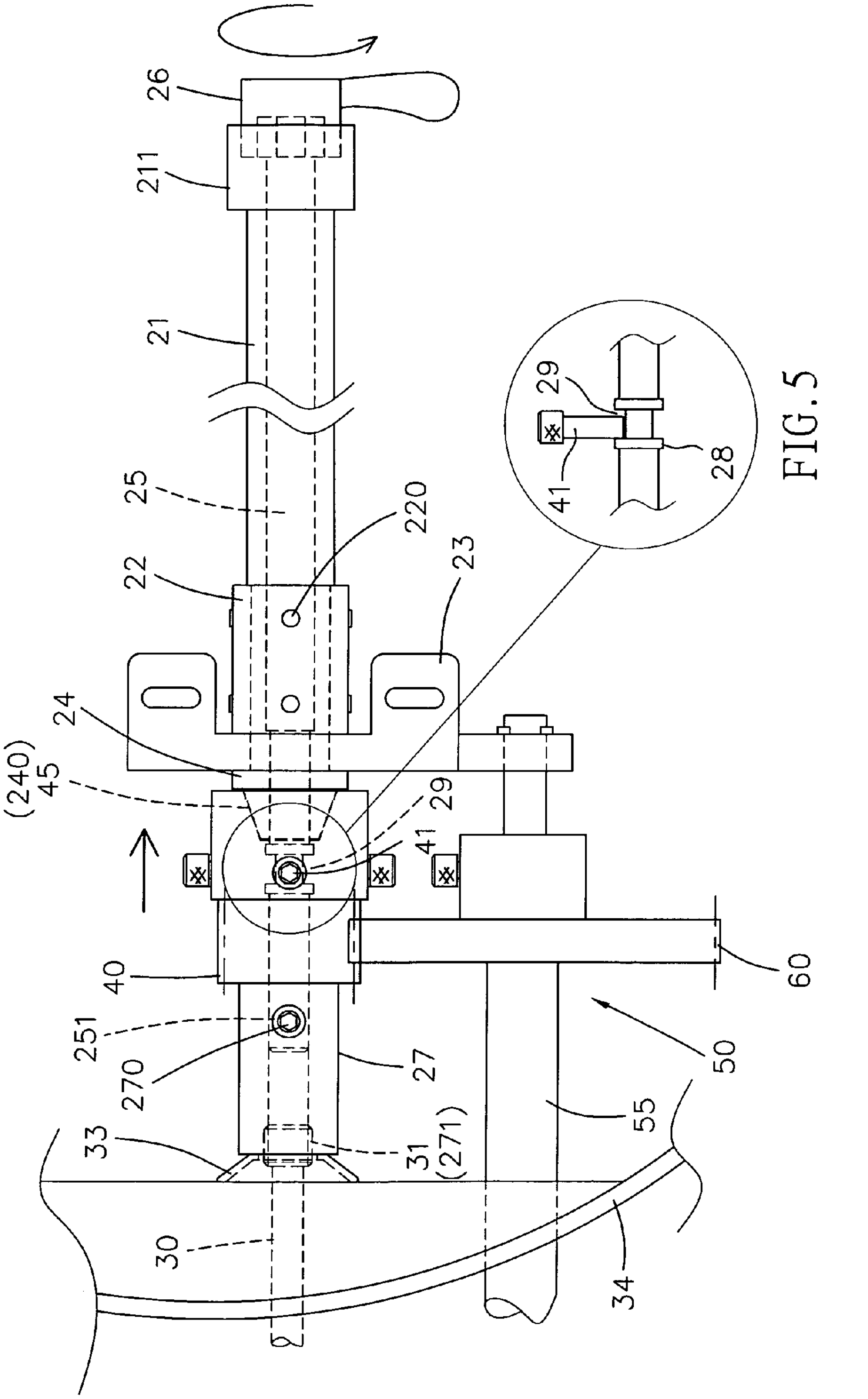
FIG. 4 is a schematic operational view of the angle adjustment device of the circular saw as shown in FIG. 2, showing the drive block and the drive gear in an attached position.
FIG. 5 is a locally enlarged view of the angle adjustment device of the circular saw as shown in FIG. 4.

When the drive lever 26 is rotated, the inner rod 25 is rotated to rotate the push barrel 27. At this time, the fixed rod 30 is fixed without rotation, so that the threaded guide hole 271 of the push barrel 27 is movable relative to the threaded guide portion 31 of the fixed rod 30 by rotation of the push barrel 27 to move the push barrel 27 to push the second end of the drive gear 40 so as to push the drive gear 40 to move toward the drive block 24 until the tapered urging hole 45 of the drive gear 40 is urged on the tapered urging face 240 of the drive block 24 as shown in FIG. 4, thereby combining the drive gear 40 with the drive block 24. Thus, the drive gear 40 will be rotated by the drive block 24.

When the outer tube 21 is rotated by the handgrip 211 which is rotated by a user, the drive block 24 is rotated to rotate the drive gear 40 which rotates the driven gear 60 which rotates the shaft 55 which rotates the transmitting gear 65 which rotates the actuated rack 13 of the rotation shaft 12 to rotate the rotation shaft 12 so as to change and adjust the tilt or bevel angle of the pivot arm 15.

Accordingly, the user can rotate the handgrip 211 of the outer tube 21 at the front side of the work table 10 to change and adjust the tilt or bevel angle of the pivot arm 15 directly, thereby facilitating the user adjusting the tilt angle of the pivot arm 15. In addition, the user can rotate the handgrip 211 of the outer tube 21 easily and conveniently, so that the tilt angle of the pivot arm 15 is adjusted exactly. Further, the disk spring 33 is biased between the fixed rack 34 and the push barrel 27 to counteract a gap between the threaded guide portion 31 of the fixed rod 30 and the threaded guide hole 271 of the push barrel 27, so that the tilt angle of the pivot arm 15 is adjusted exactly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A circular saw, comprising:

a work table;

an angle adjustment device mounted on the work table and including:

an outer tube rotatably mounted on a bottom of the work table;

a drive block having a first end secured to a first end of the outer tube to rotate with the outer tube synchronously;

an inner rod rotatably and movably mounted in the outer tube and the drive block and having a first end protruding outward from the drive block;

a drive gear movably mounted on the inner rod and having a first end detachably urged on a second end of the drive block to rotate with the drive block by rotation of the outer tube;

a fixed rod located under the work table and having a distal end formed with a threaded guide portion;

a push barrel secured on the first end of the inner rod to rotate and move with the inner rod and having an inner wall formed with a threaded guide hole screwed onto the threaded guide portion of the fixed rod;

a driving unit including a shaft rotatably mounted on the work table, a driven gear secured on a first end of the shaft to rotate the shaft and meshing with and rotated by the drive gear, and a transmitting gear secured on a second end of the shaft to rotate with the shaft;

wherein the threaded guide hole of the push barrel is movable relative to the threaded guide portion of the fixed rod by rotation of the push barrel to move the push barrel to push a second end of the drive gear so as to push the drive gear to move toward the drive block.

2. The circular saw in accordance with claim 1, wherein the first end of the inner rod is formed with a threaded position bore, and the angle adjustment device further includes a threaded positioning member extended through a peripheral wall of the push barrel and screwed into the positioning bore of the inner rod, so that the push barrel is secured on the first end of the inner rod.

3. The circular saw in accordance with claim 1, wherein the outer tube has a second end protruding outward from the work table and formed with an enlarged cylindrical handgrip.

4. The circular saw in accordance with claim 3, wherein the angle adjustment device further includes a drive lever rotatably and movably mounted on the handgrip of the outer tube and secured on a second end of the inner rod to rotate the inner rod.

5. The circular saw in accordance with claim 4, wherein the second end of the inner rod is formed with a hexagonal head, and the drive lever has an inside formed with a hexagonal fixing recess mounted on the hexagonal head of the inner rod, so that the drive lever is secured on the second end of the inner rod.

6. The circular saw in accordance with claim 1, wherein the second end of the drive block has an end face formed with a tapered urging face, and the first end of the drive gear has an end face formed with a tapered urging hole detachably urged on the tapered urging face of the drive block.

7. The circular saw in accordance with claim 6, wherein the angle adjustment device further includes a plurality of limit members each extended through a peripheral wall of the drive gear and each movably mounted on the inner rod.

8. The circular saw in accordance with claim 7, wherein the inner rod has a mediate portion formed with two annular retaining flanges and annular retaining groove located between the two retaining flanges, and each of the limit members of the drive gear is movably in the retaining groove and stopped by the two retaining flanges of the inner rod.

9. The circular saw in accordance with claim 8, wherein each of the limit members of the drive gear has a diameter smaller than a width of the retaining groove of the inner rod, so that the drive gear can idle relative to the inner rod and can locally translate relative to the inner rod.

10. The circular saw in accordance with claim 6, wherein the drive gear is movable on the inner rod between the drive block and the push barrel.

11. The circular saw in accordance with claim 6, wherein the further comprising a rotation shaft rotatably mounted on the work table and having an end provided with an actuated rack meshing with and rotated by the transmitting gear of the driving unit, and a pivot arm pivotally mounted on the rotation shaft.

12. The circular saw in accordance with claim 11, wherein when the outer tube is rotated by a user, the drive block is rotated to rotate the drive gear which rotates the driven gear which rotates the shaft which rotates the transmitting gear which rotates the actuated rack of the rotation shaft to rotate the rotation shaft.

13. The circular saw in accordance with claim 1, wherein the angle adjustment device further includes a fixing seat secured on the bottom of the work table for supporting the drive block, and a connecting tube mounted between the first end of the outer tube and the first end of the drive block to connect the outer tube with the drive block.

14. The circular saw in accordance with claim 13, wherein the first end of the outer tube is formed with a reduced locking portion inserted into the connecting tube and locked by a plurality of setscrews.

15. The circular saw in accordance with claim 13, wherein the first end of the drive block is formed with a reduced locking portion extended through the fixing seat and inserted into the connecting tube and locked by a plurality of setscrews.

16. The circular saw in accordance with claim 1, wherein the fixed rod is rotatably mounted on a fixed rack on the work table.

17. The circular saw in accordance with claim 16, wherein the angle adjustment device further includes a disk spring mounted on the fixed rod and biased between the fixed rack and the push barrel to counteract a gap between the threaded guide position of the fixed rod and the threaded guide hole of the push barrel.

* * * * *